(12) United States Patent
Roggendorf

(10) Patent No.: US 7,953,524 B1
(45) Date of Patent: May 31, 2011

(54) NAVIGATION THROUGH RECEPTION OF A REMOTE POSITION FIX VIA DATA LINK

(75) Inventor: Brian R. Roggendorf, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 101 days.

(21) Appl. No.: 12/074,055

(22) Filed: Feb. 29, 2008

(51) Int. Cl.
*G06G 7/70* (2006.01)

(52) U.S. Cl. .............. 701/17; 701/23; 701/200; 342/61; 342/62; 342/63; 244/3.11; 244/3.15; 244/3.19

(58) Field of Classification Search ................ 342/62
See application file for complete search history.

(56) References Cited

U.S. PATENT DOCUMENTS

| | | | | |
|---|---|---|---|---|
| 5,339,085 A * | 8/1994 | Katoh et al. | ............... | 342/180 |
| 5,464,174 A * | 11/1995 | Laures | ............... | 244/3.11 |
| 6,527,222 B1 * | 3/2003 | Redano | ............... | 244/3.14 |
| 6,640,164 B1 * | 10/2003 | Farwell et al. | ............... | 701/2 |
| 6,640,169 B2 * | 10/2003 | Bergmann et al. | ............... | 701/36 |
| 6,666,401 B1 * | 12/2003 | Mardirossian | ............... | 244/3.11 |
| 2001/0006372 A1 * | 7/2001 | Lemelson et al. | ............... | 342/45 |
| 2005/0077424 A1 * | 4/2005 | Schneider | ............... | 244/3.11 |
| 2005/0128124 A1 * | 6/2005 | Greneker et al. | ............... | 342/22 |
| 2005/0283294 A1 * | 12/2005 | Lehman et al. | ............... | 701/50 |
| 2008/0013080 A1 * | 1/2008 | Rogitz | ............... | 356/139.01 |
| 2008/0021641 A1 * | 1/2008 | Kim | ............... | 701/209 |
| 2009/0055038 A1 * | 2/2009 | Garrec et al. | ............... | 701/17 |

* cited by examiner

*Primary Examiner* — Thomas H Tarcza
*Assistant Examiner* — Timothy A Brainard
(74) *Attorney, Agent, or Firm* — Matthew J. Evans; Daniel M. Barbieri

(57) ABSTRACT

A method of navigating a mobile platform. A reflectable electronic signal is transmitted. A reflection of the reflectable signal is received. A position of the mobile platform is determined based upon the reflection of the reflectable signal. A platform position signal is transmitted to the mobile platform. The platform position signal provides the mobile platform the determined position of the mobile platform. The mobile platform is navigated based upon the platform position signal.

8 Claims, 3 Drawing Sheets

NAVIGATION THROUGH RECEPTION OF A REMOTE POSITION FIX VIA DATA LINK

FIELD OF THE INVENTION

The present invention relates generally to the field of navigation, and more particularly, to navigation of a mobile object as assisted by wireless communications.

BACKGROUND OF THE INVENTION

Advances in technology have enabled munitions such as missiles, bombs, and artillery shells to be much more precise. Satellite-aided navigation systems, such as the Global Positioning System (GPS), is one of the more recent advances and provides an accuracy of less than ten meters even at ranges of hundreds of miles. Such accuracy would have been unheard of fifty years ago, when bombs were dropped from airplanes using optical sights.

Although GPS-guided munitions are designed to be highly accurate, one disadvantage of such munitions is the cost of the circuitry, especially considering the circuitry in a missile is designed to be used only once. Additionally, reducing the weight and space required for navigation equipment generally improves performance of munitions. Furthermore, there may be environments or scenarios in which GPS-guided navigation is ineffective. Because the GPS frequencies are well known it is common for an adversary to attempt to interfere with or replace the satellite-based GPS signals with an erroneous signal. The GPS-based navigation equipment must be updated or re-designed to stay ahead of each electronic countermeasure deployed by an adversary. Lastly, GPS-guided munitions typically also use other types of navigation aids, such as radar altimeters and inertial navigation components such as gyroscopes and accelerometers. Such aids and components are subject to malfunction or failure, and providing component redundancy increases cost and weight of munitions using such components.

The concerns and disadvantages described above are applicable at least in part to the navigation of other aerial or ground-based platforms or craft. For example, unmanned aerial vehicles (UAVs) are routinely used by the military for surveillance, reconnaissance, communications, and ordnance delivery. Civilian uses of UAVs are just beginning to be realized. Reducing the cost, weight, required space, and complexity of navigation systems would be appreciated by designers and users of UAVs and other craft.

It is therefore an object of the invention to provide an accurate, reliable navigation solution usable by various types of mobile objects and craft.

Another object of the invention is to provide a navigation solution for various mobile platforms that reduces the cost, weight, space requirements, and complexity over known navigation solutions.

It is another object to provide a navigation solution for mobile platforms that is effective in reducing the impact of electronic countermeasures employed by an adversary.

A feature of the invention is radar tracking of a mobile platform by a friendly asset and communicating the radar-derived position to the mobile platform.

An advantage of the invention is reduced cost, weight, and space requirements of the mobile platform.

SUMMARY OF THE INVENTION

The invention provides a method of navigating a mobile platform. According to the method, a reflectable signal is transmitted. A reflection of the reflectable signal is received. A position of the mobile platform is determined based upon the reflection of the reflectable signal. A platform position signal is transmitted to the mobile platform. The platform position signal provides the mobile platform the determined position of the mobile platform. The mobile platform is navigated based upon the platform position signal.

The invention also provides a method of navigating a guided projectile. According to the method, a radar signal is transmitted from a friendly asset disposed away from the guided projectile. A return of the radar signal is received. A position of the guided projectile is determined based upon the return of the radar signal. A projectile position signal is transmitted to the guided projectile. The projectile position signal provides the guided projectile the determined position of the guided projectile. The guided projectile is navigated based upon the projectile position signal.

The invention further provides a method of navigating a guided projectile to a target. According to the method, a first radar signal is transmitted. A return of the first radar signal is received. A position of the guided projectile is determined based upon the return of the first radar signal. A second radar signal is transmitted. A return of the second radar signal is received. A position of the target is determined based upon the return of the second radar signal. A projectile position signal is transmitted to the guided projectile. The projectile position signal provides the guided projectile the determined position of the guided projectile. A target position signal is transmitted to the guided projectile. The target position signal provides the guided projectile the determined position of the target. The guided projectile is navigated toward the target based upon the projectile position signal and the target position signal.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE DRAWINGS

Reference will now be made in detail to the presently preferred embodiments of the invention, examples of which are illustrated in the accompanying drawings. It is to be appreciated that corresponding reference numbers refer to generally corresponding structures.

Figure 1:
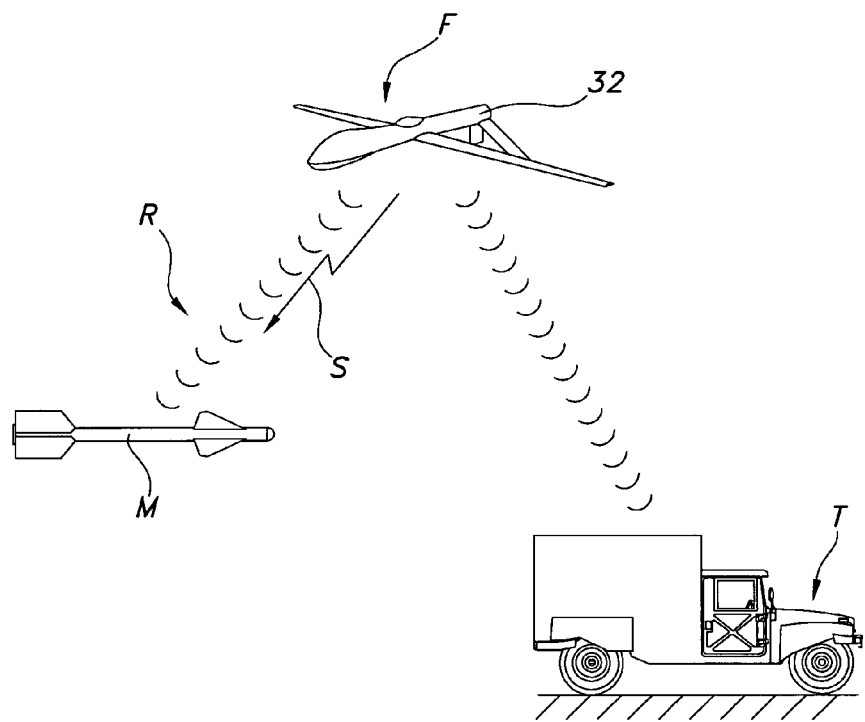
FIG. 1 is a side elevational view of various elements of the invention according to one embodiment.

An embodiment of the invention can be summarized with reference to FIG. 1, which depicts a guided projectile or missile M in flight toward an intended target T. Returns from a reflectable signal such as radar R sent from a friendly asset F enables the friendly asset to determine a position of missile M. The friendly asset transmits a signal S to missile M containing the radar-determined position of the missile. Missile M uses the radar-determined location to navigate toward target T.

Figure 2:
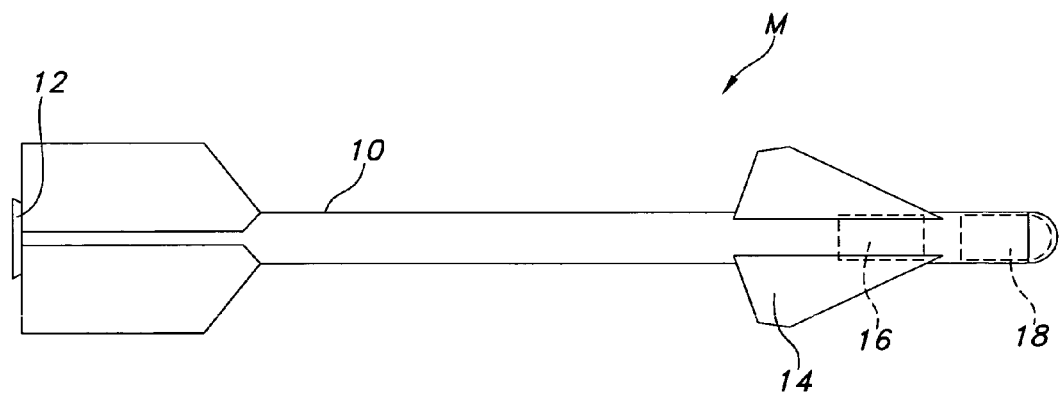
FIG. 2 is a side elevational view of a mobile platform shown in FIG. 1.

Now describing the invention in more detail, FIG. 2 depicts missile M as shown in FIG. 1. Missile M represents any type of mobile platform that navigates toward a target or destination. Within an outer covering 10 of missile M there may be a propulsion system 12 that typically includes a rocket engine powered by solid- or liquid-fuel propellant. Missile M also includes a steering system 14 includes a plurality of fins that are movable to maintain or change the direction of the missile during flight. A navigation system 16 receives inputs from various sensors or databases as described below and sends outputs to the steering system and the propulsion system to effect a desired flight or trajectory. Missile M further includes a payload 18 that is designed to be delivered to target T during or at the termination of the flight of the missile. It is to be understood that these components of missile M may be positioned anywhere within the missile as desired and are not limited to the notional locations indicated herein.

Figure 3:
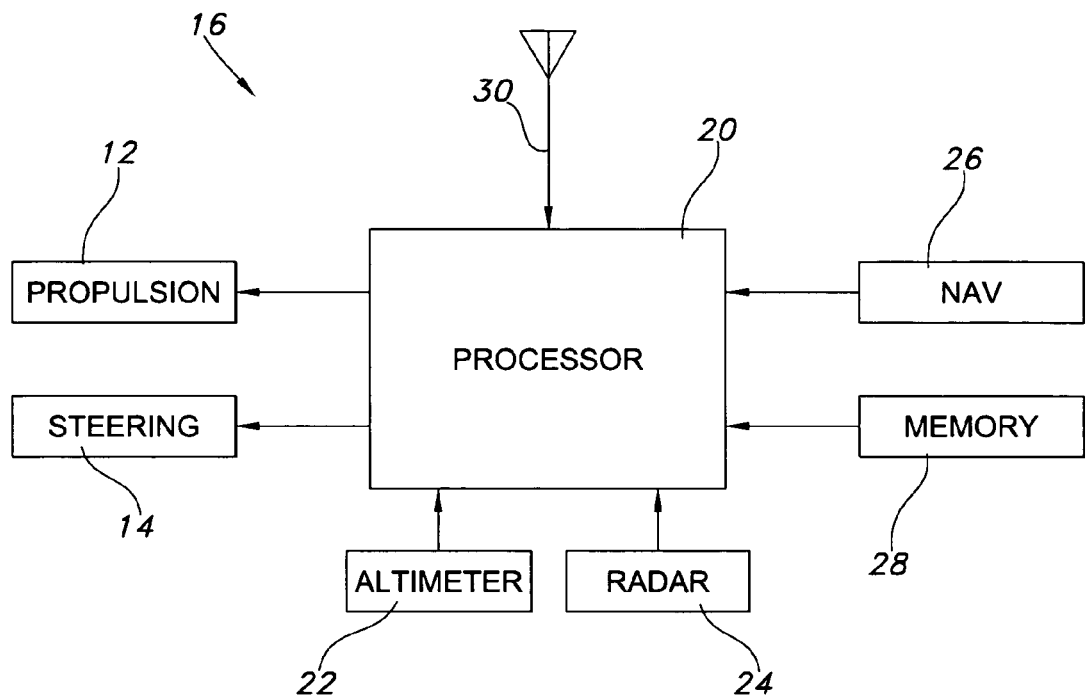
FIG. 3 is a schematic view of a navigational system of the mobile platform shown in FIG. 2.

FIG. 3 is a schematic view of navigation system 16. The navigation system includes a processor 20. Inputs from a radio altimeter 22, internal radar 24, and inertial navigation components 26 such as accelerometers, gyroscopes and the like, are provided to processor 20. A memory 28 provides input regarding terrain or hazard information. An antenna 30, shown in FIG. 2 as extending from outer covering 10, receives position signals from friendly asset F (FIG. 1). The position signals represent the position of missile M as well as a potential target T. Processor 20 takes information from one or more of the inputs 22, 24, 26, 28, 30 and determines the position of missile M as well as target T. The processor sends output signals to one or both of propulsion system 12 and steering system 14 to maintain or modify the flight or trajectory of missile M.

As shown in FIG. 1, missile M is in flight toward target T. Friendly asset F, depicted as an unmanned aerial vehicle (UAV) 32, transmits a reflectable signal that in the currently described embodiment is a radar signal. The radar signal reflects off outer surface 10 of missile M, and a sensor aboard UAV 32 receives the reflected signal. Electronics (not shown) aboard UAV 32 determine a position of missile M based on the reflected radar signal. A transmitter aboard the UAV (not shown) transmits, preferably using known data link protocols, a missile position signal S to missile M, which is received by antenna 30 and input into processor 20. Using the information in the missile position signal, processor 20 determines the position of missile M. Processor may also use information from inputs 22, 24, 26 and 28 to determine the missile position. Processor 10 sends outputs to propulsion system 12 or steering system 14, if needed, to modify the flight or trajectory of the missile to ensure a successful mission.

UAV 32 may also transmit a radar or other electronic signal toward target T, especially if target T is capable of movement during the flight of missile M. Radar reflections of the target enable UAV 32 to determine the location of the target, and a target position signal may also be transmitted to missile M and received through antenna 30. The process of providing radar-based information to a mobile platform may be repeated as often as desired. Trajectories, velocities, and/or future positions of the mobile platform and the target can be extrapolated using successive radar sweeps.

Figure 4:
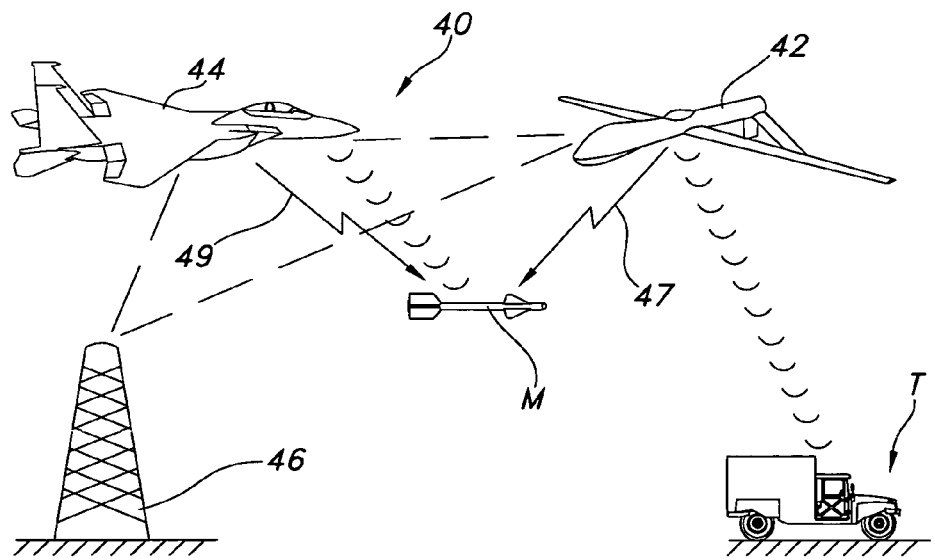
FIG. 4 is a side elevational view of various elements of the invention according to another embodiment.

It is foreseeable that a single friendly asset may not be sufficient to track a mobile platform throughout its flight or trajectory. It is also possible that a single friendly asset cannot track both the mobile platform and target T. Furthermore, mobile platform/guided projectile position signals and/or target position signals transmitted by a forward-theater asset such as a UAV may be more easily spoofed or jammed by an adversary's transmitter if the UAV and the adversary's transmitter are transmitting from a similar direction with respect to the mobile platform. In such instances it would be advantageous to use a plurality of friendly assets to perform the invention. FIG. 4 shows an asset network 40 including a UAV 42, a manned aircraft 44, and a terrestrial station 46. The assets could also include ships, land-based vehicles, hand-held radios, or the like. Each of the assets determine their own position through known methods and communicate with each of the other assets in the network. In the depicted asset network the UAV uses lidar to track the position of target T and may transmit a target position signal to other assets in the network. Manned aircraft 44 uses lidar to track the position of missile M and may transmit a missile position signal to other assets in the network. UAV 42 and manned aircraft 44 transmit the target position signal 47 and the missile position signal 49, respectively, to the missile, and the information is processed and applied as previously discussed. As missile M progresses in its flight, manned aircraft 44 may be too far away from the missile to effectively communicate therewith. In such an instance UAV 42 may transmit the missile position signal and/or the target position signal to the missile.

Figure 5:
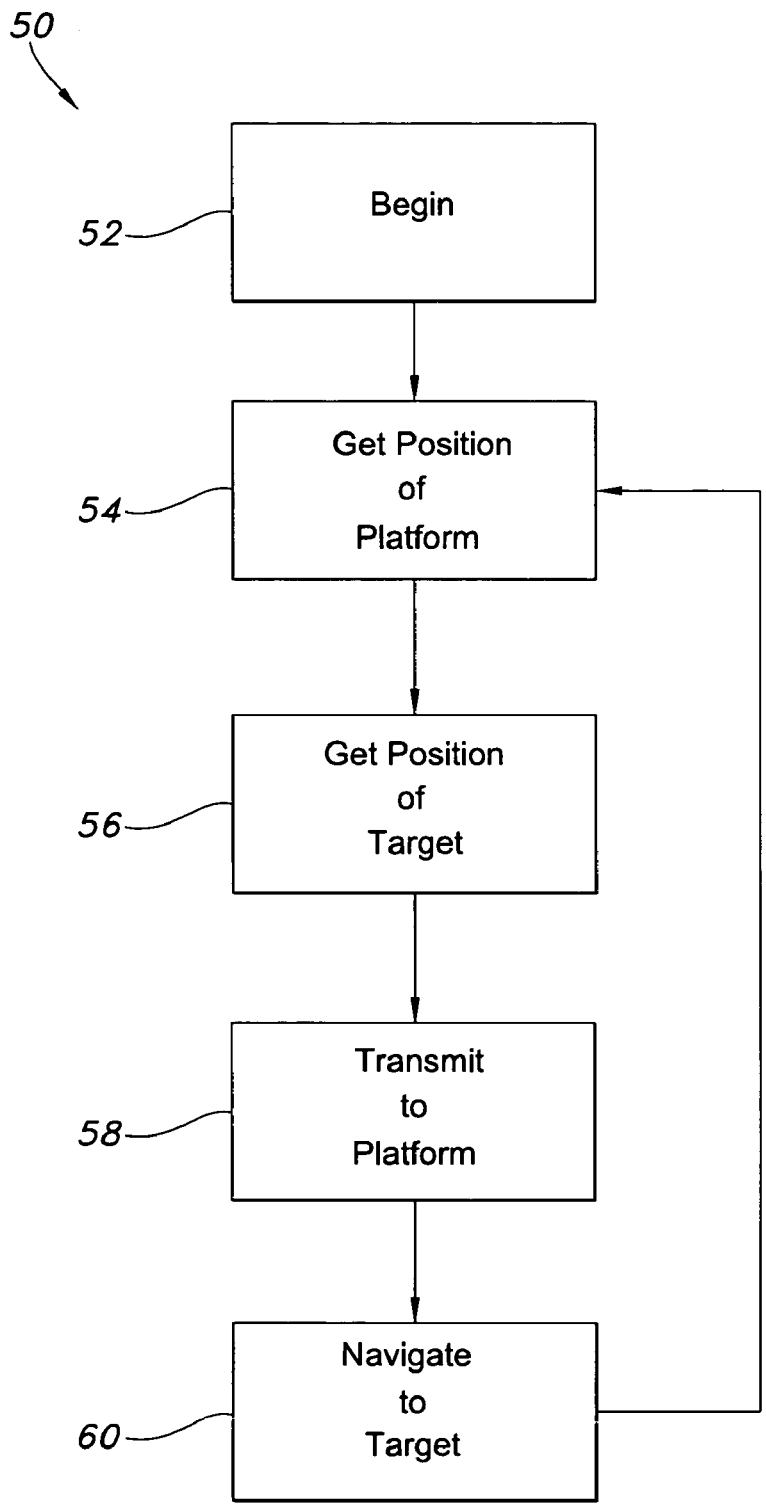
FIG. 5 is a flowchart showing a method of the invention.

FIG. 5 is a flowchart showing a method 50 according to the invention. At 52 the mobile platform begins its flight or trajectory. If the mobile platform position and the target position are not provided to processor 20 prior to the beginning of the flight, such information is provided immediately thereafter. At 54 a friendly asset transmits a reflectable signal using a technology such as radar, lidar, or the like, to detect the position of the mobile platform. At 56 a friendly asset transmits a reflectable signal using a technology such as radar, lidar, or the like, to detect the position of the anticipated target or destination of the mobile platform. At 58 a friendly asset transmits the radar-derived positions of the mobile platform and the anticipated target to the mobile platform. At 60 the mobile platform navigates toward the target using the radar-derived positions. The method repeats until the mobile platform arrives at the target or destination.

The invention may be modified in many ways while keeping within the spirit of the invention. For example, as previously mentioned the mobile platform may be a surface-to-air missile, a surface-to-surface missile, an air-to-air missile, an aerial gravity bomb, an artillery shell, an unmanned aerial vehicle, a manned aircraft, a land vehicle, a ship, or any other mobile platform that can navigate in response to a received radio signal. For example, the invention may be suited to provide position information to a navigation system of a passenger aircraft in flight or landing/take-off situations. Also, as many munitions-type aerial platforms can have extremely high velocity, the process of identifying aerial platforms using radar returns can be optimized by predetermining the radar signatures of various known aerial platforms. Additionally, the data link used by the friendly assets to communicate position information to the mobile platform may employ encryption, spread-spectrum, frequency-hopping, jittering, and/or other protocols or techniques to minimize risk of enemy jamming and spoofing. Lastly, the electronic signal has been described as a radar signal, but as demonstrated in the embodiment depicted in FIG. 4 may alternatively be an optical signal such as that used in lidar technology.

The invention as disclosed herein is designed to replace GPS circuitry, but also may be used to complement or replace other navigational aids, such as inertial instruments, radar configured onboard the mobile platform, or a radio altimeter.

An advantage of the invention is that geolocation circuitry, such as that related to GPS or the like, can be eliminated from guided weapons or other platforms. The cost, space, and complexity of the navigation system in such mobile platforms is thereby reduced when compared to navigation systems that rely on GPS navigation solutions.

Another advantage is that other redundant navigational inputs may be removed as well from a guided weapon if desired, although a means of detecting altitude such as a radio altimeter may be used if the radar returns from the friendly assets only provide latitude/longitude position information.

Another advantage is that known data link protocols can be used to transmit the mobile platform/guided projectile position signals to the mobile platform. This eliminates the need for additional development and ensures the invention can be seamlessly used with existing assets.

Still another advantage is that successive radar sweeps provide successive position information of the mobile platform and the target. The trajectories and/or future positions of the mobile platform and the target can be extrapolated therefrom, and compensating adjustments to the travel plan, flight or trajectory of the mobile platform can be easily made.

Yet another advantage is that no new sensing system is required for the invention. Existing radar- or lidar-emitting and receiving capabilities of friendly assets can be used to obtain the position information for the mobile platform and the target.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. A method of navigating a mobile platform, comprising:
    transmitting a radar signal from a friendly asset to the mobile platform, the mobile platform being an aerial platform;
    receiving, at the friendly asset, a radar return of the radar signal;
    comparing, by the friendly asset, a radar signature of the radar return against a plurality of pre-determined aerial platform radar signatures;
    identifying, via the friendly asset, the mobile platform based upon said comparing of the received radar return against the pre-determined radar signatures;
    determining, via the friendly asset, a position of the mobile platform based upon the radar return of the radar signal;
    transmitting a platform position signal from the friendly asset to the mobile platform, wherein the platform position signal includes the friendly asset-determined position of the mobile platform;
    transmitting a second radar signal from the friendly asset to a mobile target, the mobile target being positioned away from the mobile platform and the friendly asset;
    receiving a radar return of the second radar signal;
    determining, via the friendly asset, a position of the mobile target based upon the radar return of the second radar signal;
    transmitting a mobile target position signal from the friendly asset to the mobile platform, the mobile target position signal providing to the mobile platform the friendly asset-determined position of the mobile target; and
    navigating the mobile platform to the mobile target based upon the platform position signal and the mobile target position signal,
    wherein the friendly asset is positioned away from the mobile platform.

2. The method of claim 1, wherein the friendly asset is one of an aircraft and a terrestrial station.

3. The method of claim 1, wherein the determined position includes a latitude component and a longitude component.

4. The method of claim 3, wherein the position information signal provides the only latitude and longitude position information to the mobile platform.

5. The method of claim 1, wherein the aerial mobile platform is a guided projectile.

6. The method of claim 1, wherein the aerial mobile platform is one of: a missile, an artillery shell, an unmanned aerial vehicle, an aircraft, and an aerial gravity bomb.

7. A method of navigating an aerial mobile platform, comprising:
    transmitting a first radar signal from a first friendly asset to the aerial mobile platform, the first friendly asset being disposed away from the aerial mobile platform;
    receiving at the first friendly asset a radar return of the first radar signal;
    comparing, by the first friendly asset, a radar signature of the radar return against a plurality of pre-determined aerial mobile platform radar signatures;
    identifying, via the first friendly asset, the aerial mobile platform based upon said comparing of the received radar return against the pre-determined radar signatures;
    determining, via the first friendly asset, a position of the aerial mobile platform based upon the radar return;
    transmitting an aerial mobile platform position signal from the first friendly asset to the aerial mobile platform, the aerial mobile platform position signal providing the first friendly asset-determined position of the aerial mobile platform;
    transmitting a second radar signal from a second friendly asset to an aerial mobile platform target, the second friendly asset being positioned away from the first friendly asset, the aerial mobile platform target being positioned away from the aerial mobile platform, first friendly asset and second friendly asset, the aerial mobile platform target being a moving target;
    receiving at the second friendly asset a radar return of the second radar signal;

determining, via the second friendly asset, a position of the aerial mobile platform target based upon the return of the second radar signal;

transmitting an aerial mobile platform target position signal from the second friendly asset to the aerial mobile platform, the aerial mobile platform target position signal providing to the aerial mobile platform the second friendly asset-determined position of the aerial mobile platform target; and navigating the guided projectile towards the aerial mobile platform target based upon the aerial mobile platform position signal and the aerial mobile platform target position signal.

8. A method of navigating an aerial mobile platform, comprising:

transmitting a first radar signal from a first friendly asset to the aerial mobile platform, the first friendly asset being disposed away from the aerial mobile platform;

receiving at the first friendly asset a radar return of the first radar signal;

comparing, by the first friendly asset, a radar signature of the radar return against a plurality of pre-determined aerial mobile platform radar signatures;

identifying, via the first friendly asset, the aerial mobile platform based upon said comparing of the received radar return against the pre-determined radar signatures;

determining, via the first friendly asset, a position of the aerial mobile platform based upon the radar return;

transmitting a second radar signal from the first friendly asset to an aerial mobile platform target, the aerial mobile platform target being positioned away from the aerial mobile platform and first friendly asset, the aerial mobile platform target being a moving target;

receiving at the first friendly asset a radar return of the second radar signal;

determining, via the first friendly asset, a position of the aerial mobile platform target based upon the return of the second radar signal;

transmitting an aerial mobile platform position signal from the first friendly asset to a second friendly asset, the second friendly asset being positioned away from the first friendly asset, the aerial mobile platform, and the aerial mobile platform target, the aerial mobile platform position signal providing the first friendly asset-determined position of the aerial mobile platform;

transmitting an aerial mobile platform target position signal from the first friendly asset to the second friendly asset, the aerial mobile platform target position signal providing the first friendly asset-determined position of the aerial mobile platform target;

transmitting the aerial mobile platform position signal and the aerial mobile platform target position signal from the second friendly asset to the aerial mobile platform;

navigating the aerial mobile platform towards the aerial mobile platform target based upon the aerial mobile platform position signal and the aerial mobile platform target position signal.

\* \* \* \* \*